(12) United States Patent
Yen et al.

(10) Patent No.: US 10,844,236 B2
(45) Date of Patent: Nov. 24, 2020

(54) LIQUID BONDING AGENT FOR LIQUID INK

(71) Applicant: HEWLETT-PACKARD DEVELOPMENT COMPANY, L.P., Houston, TX (US)

(72) Inventors: Max Yen, San Diego, CA (US); Yi-Hua Tsao, San Diego, CA (US); Marisa Weaver, San Diego, CA (US); Elizabeth Ann Visnyak, San Diego, CA (US); Jessica Rikki Vosler, San Diego, CA (US); Jon A. Crabtree, San Diego, CA (US); George Sarkisian, San Diego, CA (US); Yubai Bi, San Diego, CA (US); Maria Alexeevna Kabalnova, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/093,380

(22) PCT Filed: Jul. 20, 2016

(86) PCT No.: PCT/US2016/043211
§ 371 (c)(1),
(2) Date: Oct. 12, 2018

(87) PCT Pub. No.: WO2018/017085
PCT Pub. Date: Jan. 25, 2018

(65) Prior Publication Data
US 2019/0136078 A1    May 9, 2019

(51) Int. Cl.
*C09D 11/102*    (2014.01)
*C09D 11/12*    (2006.01)
(Continued)

(52) U.S. Cl.
CPC ............ *C09D 11/38* (2013.01); *C09D 11/023* (2013.01); *C09D 11/10* (2013.01); *C09D 11/102* (2013.01);
(Continued)

(58) Field of Classification Search
None
See application file for complete search history.

(56) References Cited

U.S. PATENT DOCUMENTS 5,847,738 A    12/1998  Tutt et al.
6,207,258 B1 *  3/2001  Varnell .................. D21H 21/16
                                                       428/32.1
(Continued)

FOREIGN PATENT DOCUMENTS

EP    1048466    11/2000
EP    1057646    12/2000
(Continued)

OTHER PUBLICATIONS

International Search Report and Written Opinion for International Application No. PCT/US2016/043211 dated Apr. 20, 2017, 8 pages.

*Primary Examiner* — Vu A Nguyen
(74) *Attorney, Agent, or Firm* — Dierker & Kavanaugh PC

(57) ABSTRACT

An example of a liquid bonding agent, for a liquid ink including a wax emulsion in an amount less than 1% actives, includes a calcium salt, the wax emulsion, an acetylenic surfactant, a glycol, and a balance of water. The wax emulsion is present in the liquid bonding agent in an amount ranging from greater than 0% actives to about 2% actives. The liquid bonding agent is to be digitally printed with a thermal inkjet printhead on a substrate under the liquid ink.

13 Claims, 4 Drawing Sheets

(51) Int. Cl.
   *C09D 11/322* (2014.01)
   *C09D 11/38* (2014.01)
   *C09D 11/54* (2014.01)
   *C09J 11/06* (2006.01)
   *C09J 191/06* (2006.01)
   *C09J 11/04* (2006.01)
   *C09D 11/10* (2014.01)
   *C09D 11/023* (2014.01)

(52) U.S. Cl.
   CPC ............ *C09D 11/12* (2013.01); *C09D 11/322* (2013.01); *C09J 11/04* (2013.01); *C09J 11/06* (2013.01); *C09J 191/06* (2013.01)

(56) References Cited

U.S. PATENT DOCUMENTS

| | | |
|---|---|---|
| 8,246,155 B2 | 8/2012 | Rengaswamy et al. |
| 8,916,625 B2 * | 12/2014 | Denda .................. C09D 11/102 523/160 |
| 2006/0116439 A1 | 6/2006 | Sarkisian et al. |
| 2009/0036619 A1 | 2/2009 | Herrmann et al. |
| 2010/0086692 A1 | 4/2010 | Ohta |
| 2013/0307899 A1 | 11/2013 | Saito et al. |
| 2015/0191031 A1 * | 7/2015 | Ohta ...................... B41J 2/2114 428/207 |

FOREIGN PATENT DOCUMENTS

| | | | |
|---|---|---|---|
| JP | H03160068 | 7/1991 | |
| JP | 2006168145 | 6/2006 | |
| JP | 2012200999 | 12/2012 | |
| WO | WO-0153071 | 7/2001 | |
| WO | WO-2009009285 | 1/2009 | |
| WO | WO-2011011359 | 1/2011 | |
| WO | WO 2012132305 | 10/2012 | |
| WO | WO-2015098185 | 7/2015 | |
| WO | WO-2015116029 | 8/2015 | |
| WO | WO-2015116029 A1 * | 8/2015 | ........... C09D 11/322 |
| WO | WO-2016018306 | 2/2016 | |

* cited by examiner

LIQUID BONDING AGENT FOR LIQUID INK

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features of examples of the present disclosure will become apparent by reference to the following detailed description and drawings, in which like reference numerals correspond to similar, though perhaps not identical, components.

DETAILED DESCRIPTION

Figure 1A:
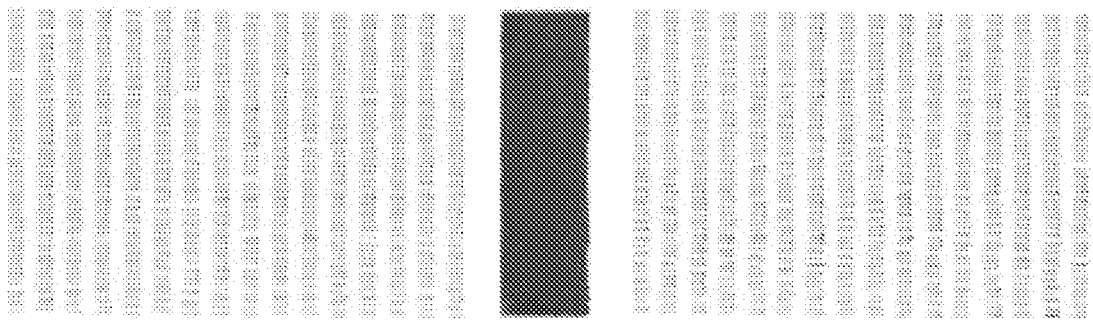
FIGS. 1A and 1B are illustrations of a first nozzle health pattern and a second nozzle health pattern (respectively) of an example of the liquid ink disclosed herein.

In thermal inkjet printing, wax emulsions may be added to thermal inkjet inks to improve the durability of the resulting print film. In particular, wax emulsions may improve the smear and abrasion resistance of the resulting print film. However, incorporating wax emulsions into thermal inkjet inks may lead to complications with thermal inkjet print nozzle health and reliability. For example, the presence of a wax emulsion in a thermal inkjet ink may cause clogging of manufacturing filters and printer filters. Clogged filters may restrict the ink flow rate and cause a pressure drop on the back end of the filter. The presence of a wax emulsion in a thermal inkjet ink may also cause the formation of agglomerates in printhead nozzles. During printing, thermal inkjet printhead nozzles are heated and exposed to air, which can cause the evaporation of volatile ink components and the precipitation of agglomerates in the printhead nozzles. Such agglomerates in printhead nozzles may prevent proper printhead firing and operational downtime may be required so that the printhead may be serviced to remove the agglomerates.

Disclosed herein is a liquid bonding agent, which includes a specific amount of a wax emulsion. The liquid bonding agent is to be digitally printed with a thermal inkjet printhead on a substrate under a liquid ink, which includes a wax emulsion in an amount less than 1% actives. The "% actives" represents the solids level of a particular component (e.g., pigment, polyurethane, wax). The raw material of the component may be an emulsion or dispersion, and the amount of the emulsion or dispersion that is added to the liquid bonding agent or the liquid ink is enough to achieve a solids level that is the % actives (e.g., 4 grams of a 50% solids wax emulsion is included in a 100 gram ink to obtain 2% actives; 2%*100 grams/50% solids=4 grams).

Incorporating the wax emulsion in the liquid bonding agent allows for a reduction in the amount of the wax emulsion that would otherwise be incorporated in the liquid ink in order to achieve a threshold level of print film durability. The reduction in the amount of the wax emulsion in the liquid ink allows for improvement in the health and reliability of the thermal inkjet print nozzles that are dispensing the liquid ink. For example, the reduction in the amount of the wax emulsion in the liquid ink may lead to improved filterability, reduced agglomerate formation, and improved agglomerate recoverability in thermal inkjet print nozzles.

As used herein, the term "filterability" may refer to the rate at which an ink is able to travel through a filter and/or the amount of ink that is able to be passed through the filter before the filter clogs. As used herein, "agglomerate formation" may refer to the amount of precipitates that have accumulated in a printhead nozzle during a set time period. Also as used herein, "agglomerate recoverability" may refer to the amount of precipitates that may be removed from a printhead nozzle by mechanically servicing the printhead. Servicing may include nozzle spitting, wiping with dry polyester fabric, wiping with a water-wetted polyester fabric, flushing with de-ionized water, or combinations thereof.

Additionally, when the liquid bonding agent and the liquid ink disclosed herein are used together, a suitable amount of wax is present in the resulting print, and thus an acceptable level of durability can be achieved.

The liquid bonding agent, with the wax emulsion incorporated therein, is able to be reliably printed with thermal inkjet print nozzles. While not being bound to any theory, it is believed that the liquid bonding agent may be reliably printed even though it includes a specific amount of the wax emulsion (e.g., greater than 0% actives to about 2% actives) because the liquid bonding agent does not include a pigment (e.g., a pigment dispersion) and/or a binder (e.g., a polyurethane dispersion). This is in contrast to the liquid ink, which includes one or both of these components. Because the liquid bonding agent does not include these components, the total amount of non-soluble solids is lower in the liquid bonding agent than in, e.g., the liquid ink that includes one or both of these components. Thus, the filterability of the liquid bonding agent, and the agglomerate formation and agglomerate recoverability in thermal inkjet print nozzles that dispense the liquid bonding agent are at levels that are acceptable for reliable thermal inkjet printing.

The liquid bonding agent is a liquid, and may be included in a single cartridge set or a multiple-cartridge set. In the multiple-cartridge set, at least one cartridge may include the liquid bonding agent and any number of the other cartridges may include the liquid ink having the wax emulsion incorporated therein in an amount of less than 1% actives.

In an example, the liquid bonding agent disclosed herein includes the wax emulsion, a calcium salt, an acetylenic surfactant, a glycol, and a balance of water. In some examples, the liquid bonding agent consists of these components with no other components. In some other examples, the liquid bonding agent excludes a pigment and a polymeric binder.

As used herein, the terms "liquid vehicle," and "vehicle" may refer to the liquid fluid in which the wax emulsion and calcium salt are placed to form the liquid bonding agent. A wide variety of liquid vehicles may be used with the bonding agent of the present disclosure. The liquid vehicle may include water alone or in combination with a mixture of a variety of additional components. Examples of these additional components may include the acetylenic surfactant(s), glycol(s), additional co-solvent(s), and/or antimicrobial agent(s).

The liquid vehicle of the liquid bonding agent includes the acetylenic surfactant. The acetylenic surfactant may be present in an amount ranging from about 0.25 wt % to about 2 wt % (based on the total wt % of the liquid bonding agent). In an example, the acetylenic surfactant is non-ionic. Acetylenic surfactants can include acetylenic diols, alkoxylated acetylenic diols, and other acetylenic surfactants. Some specific examples include 2,7-dimethyl-4-octyn-3,6-diol, 7-tetradecyn-6,9-diol, 2,4,7,9-tetramethyl-5-decyne-4,7-diol, 1,4-dimethyl-1,4-bis(2-methylpropyl)-2-butyne-1,4-diyl ether, ethylene or propylene oxide condensates thereof, or a combination thereof. Some suitable commercially available acetylenic surfactants include SURFYNOL® and DYNOL™ surfactants available from Air Products.

As mentioned above, the liquid vehicle of the liquid bonding agent also includes a glycol. The liquid vehicle of the liquid bonding agent may also include additional co-solvent(s). The glycol may be present in an amount ranging from about 2 wt % to about 20 wt % (based on the total wt % of the liquid bonding agent). When the liquid vehicle includes additional co-solvent(s) as well as the glycol, the total amount of the additional co-solvent(s) and the glycol present in the liquid bonding agent may range from about 5 wt % to about 20 wt % (based on the total wt % of the liquid bonding agent). It is to be understood that other amounts outside of these examples and ranges may also be used.

The liquid vehicle may also include antimicrobial agent(s). Suitable antimicrobial agents include biocides and fungicides. Example antimicrobial agents may include the NUOSEPT® (Ashland Inc.), UCARCIDE™ or KORDEK™ (Dow Chemical Co.), and PROXEL® (Arch Chemicals) series, and combinations thereof. In an example, the liquid bonding agent may include a total amount of antimicrobial agents that ranges from about 0.1 wt % to about 0.25 wt %.

As mentioned above, the wax emulsion is included in the liquid bonding agent. The wax emulsion may be present in the liquid bonding agent in an amount ranging from greater than 0% actives to about 2% actives (based on the total wt % of the liquid bonding agent). This weight percentage accounts for the weight percent of active wax present in the liquid bonding agent, and does not account for the total weight percent of the wax emulsion in the liquid bonding agent. As such, the weight percentages given for the wax emulsion do not account for any other components (e.g., water) that may be present when the wax is part of the emulsion.

In an example, the melting point of the wax in the wax emulsion is either less than 105° C. or greater than 300° C. The wax in the wax emulsion having such a melting point allows the liquid bonding agent to be jettable from a thermal inkjet system. If the wax in the wax emulsion has a melting point between 105° C. and 300° C., the liquid bonding agent may not be jettable or may lead to failures in the thermal inkjet system. Examples of suitable wax emulsions include a low density polyethylene wax emulsion, a paraffin wax emulsion, a carnauba wax emulsion, a polytetrafluoroethylene wax emulsion, or a combination thereof.

Suitable wax emulsions are commercially available from a number of vendors, for example Lubrizol, Michelman, Keim-Additec, and BYK Chemie. Wax emulsions that may be used in the examples disclosed herein include: Lubrizol: LIQUILUBE™ 411, LIQUILUBE™ 405, LIQUILUBE™ 488, LIQUILUBE™ 443, LIQUILUBE™ 454; Michelman: ME80825, ME48040, ME98040M1, ME61335, ME90842, ME91240, ML160; Keim-Additec: ULTRALUBE® E-521/20, ULTRALUBE® E-7093, ULTRALUBE® 7095/1, ULTRALUBE® E-8046, ULTRALUBE® E-502V, ULTRALUBE® E-842N: Byk: AQUACER® 8517, AQUACER® 2650, AQUACER® 507, AQUACER® 533, AQUACER® 515, AQUACER® 537, AQUASLIP™ 671, and AQUASLIP™ 942.

The particle size of the wax in the wax emulsion may also affect the jettability of the liquid bonding agent. "Particle size", as used herein refers to the diameter of a substantially spherical particle (i.e., a spherical or near-spherical particle having a sphericity of >0.84), or the average diameter of a non-spherical particle (i.e., the average of multiple diameters across the particle). The average particle size of the particles of the wax may be less than 500 nm.

The wax emulsion also includes an emulsifier to stabilize the wax emulsion. The emulsifier may be present in an amount suitable to stabilize the wax emulsion. In an example, the emulsifier used to stabilize the wax emulsion is a non-ionic emulsifier. If the emulsifier were to be an anionic emulsifier, the anionic emulsifier would be susceptible to flocculation by the calcium cation of the calcium salt included in the liquid bonding agent. If the emulsifier were to be a cationic emulsifier, the cationic emulsifier would be susceptible to flocculation by the anion of the calcium salt. Additionally, the cationic emulsifier may be incompatible with the liquid ink because the cationic emulsifier would be susceptible to flocculation with the anionic components (e.g., an anionic polymeric dispersant) of the liquid ink. Thus, in examples in which the wax emulsion in the liquid bonding agent is the same as the wax emulsion in the liquid ink, the non-ionic emulsifier may be used rather than the cationic emulsifier. Examples of the non-ionic emulsifier may include ethoxylated alcohols and ethoxylated fatty esters.

The liquid bonding agent also includes the calcium salt. The calcium salt allows the liquid bonding agent to fix (e.g., prevent bleed of) the liquid ink on a substrate when the liquid bonding agent is printed on the substrate under the liquid ink. The calcium salt may be present in the liquid bonding agent in an amount ranging from about 5 wt % to about 15 wt % (based on the total wt % of the liquid bonding agent). Examples of suitable calcium salts include calcium propionate, calcium pantothenate, calcium nitrate, and combinations thereof.

The wax emulsion may be added with the calcium salt and the other components of the liquid vehicle to form the liquid bonding agent. The balance of the liquid bonding agent is water.

As mentioned above, the liquid bonding agent is to be digitally printed with a thermal inkjet printhead on a substrate under the liquid ink. The liquid ink includes the wax emulsion in an amount less than 1% actives. In an example, the liquid ink includes a pigment dispersion, a polyurethane dispersion, the wax emulsion, an ether co-solvent, and a balance of water. In some examples, the liquid ink consists of these components, with no other components. In other examples, the liquid ink may include different and/or additional components.

As used herein, "ink vehicle" may refer to the liquid fluid in which the pigment (e.g., a pigment dispersion), the polyurethane (e.g., a polyurethane dispersion), and the wax emulsion are placed to form the liquid ink(s). A wide variety of ink vehicles may be used with the ink set(s) of the present disclosure. The ink vehicle may include water alone or in combination with a variety of additional components. Examples of these additional components may include the ether co-solvent(s), additional co-solvent(s), acetylenic surfactant(s), phosphate surfactant(s), humectant(s), antimicrobial agent(s), and/or anti-kogation agent(s).

The ink vehicle may include the ether co-solvent. The ink vehicle may also include additional co-solvent(s). The ether co-solvent may be present in an amount ranging from about 2 wt % to about 12 wt % (based on the total wt % of the liquid ink). When the ink vehicle includes additional co-solvent(s) as well as the ether co-solvent, the total amount of the additional co-solvent(s) and the ether co-solvent present in the liquid ink agent may range from about 5 wt % to about 20 wt % (based on the total wt % of the liquid ink). It is to be understood that other amounts outside of these examples and ranges may also be used.

Examples of the ether co-solvent include glycol alkyl ethers, propylene glycol alkyl ethers, and higher homologs ($C_6$-$C_{12}$) of polyethylene glycol alkyl ethers. Glycol ether co-solvents can have the molecular formula of R'—O—$CH_2CH_2OH$, where R' is a $C_1$-$C_7$ liner, branched, or cyclic alkyl group. In some examples, a single glycol ether co-solvent can be used. In other examples, a combination of glycol ether co-solvents can be used. In one specific example, the glycol ether can include ethylene glycol monobutyl ether. In other specific examples, the glycol ether can include tripropyleneglycol methyl ether, dipropylene glycol butyl ether, and/or propylene glycol phenyl ether.

The ink vehicle may also include acetylenic surfactant(s) and/or phosphate surfactant(s). The acetylenic surfactant may be present in an amount ranging from about 0.25 wt % to about 2 wt % (based on the total wt % of the liquid ink). The acetylenic surfactant in the liquid ink may be any of the surfactants listed above in reference to the acetylenic surfactant in the liquid bonding agent. The phosphate surfactant may be present in an amount ranging from about 0.25 wt % to about 2 wt % (based on the total wt % of the liquid ink).

In some examples, the phosphate surfactant can be a phosphate ester of fatty alcohols or fatty alcohol alkoxylates. In one example, the surfactant can be a mixture of mono- and diesters, and may have an acid number ranging from 50 to 150. In another example, the phosphate-containing surfactant can be of the CRODAFOS family. Specific examples include oleth-3 phosphate, oleth-10 phosphate, oleth-5 phospahte, dioleyl phosphate, ppg-5-ceteth-10 phosphate, $C_9$-$C_{15}$alkyl monophosphate, deceth-4 phosphate, and mixtures thereof. Other specific examples by tradename include CRODAFOS N3A, CRODAFOS N3E, CRODAFOS N10A, CRODAFOS HCE, CRODAFOS SG, ARLANTONE Map 950, MONOFAX 831, MONOFAS 1214, MONALUBE 215, and ATLOX DP13/6.

Humectants may also be included in the ink vehicle. An example of a suitable humectant is LIPONIC® EG-1 (LEG-1, glycereth-26, available from Lipo Chemicals). Other examples of humectants may include polyols, such as 1,2-hexanediol, 1,3-propanediol, glycerol, tri-ethylene glycol, and combinations. Other humectants can also be used. The humectant may be added to the liquid ink in an amount ranging from about 2 wt % to about 12 wt % (based on the total wt % of the liquid ink).

The ink vehicle may also include antimicrobial agent(s). Suitable antimicrobial agents for use in the liquid ink include any of the above listed antimicrobial agents for use in the liquid bonding agent. In an example, the liquid ink may include a total amount of antimicrobial agents that ranges from about 0.1 wt % to about 0.25 wt %. In some instances, the antimicrobial agent may be present in the pigment dispersion that is added to the other ink components.

An anti-kogation agent may also be included in the ink vehicle. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as CRODA-FOS™ O3A or CRODAFOS™ N-3 acid) or dextran 500 k. Other suitable examples of the anti-kogation agents include CRODAFOS™ HCE (phosphate-ester from Croda Int.), CRODAFOS® N10 (oleth-10-phosphate from Croda Int.), or DISPERSOGEN® LFH (polymeric dispersing agent with aromatic anchoring groups, acid form, anionic, from Clariant), etc. The anti-kogation agent may be present in the liquid ink in an amount ranging from about 0.1 wt % to about 1 wt % of the total wt % of the liquid ink. In the examples disclosed herein, the anti-kogation agent may improve the jettability of the liquid ink.

In some examples disclosed herein, the ink vehicle of the liquid thermal inkjet ink may also include viscosity modifier(s), material(s) for pH adjustment, sequestering agent(s), preservative(s), jettability additive(s) (e.g., glycereth-26 (LEG-1), available from Liponics), and the like.

The liquid ink may be any color, such as black, cyan, magenta, yellow, etc. As such, in addition to the ink vehicle, the liquid ink also includes a colorant.

In an example, the colorant is an anionically dispersed pigment. In an example, the anionically dispersed pigment is a dispersion including water, the pigment, and an anionic polymer that disperses the pigment (i.e., the anionic polymeric dispersant). In an example, the pigment dispersion may also include, for example, a co-solvent, such as 2-pyrrolidone. The pigment dispersion may be prepared or purchased, and the other components of the ink (e.g., vehicle components) may be slowly added to the pigment dispersion with continuous mixing, to form the ink composition/liquid ink.

As used herein, "pigment" may generally include organic or inorganic pigment colorants, magnetic particles, aluminas, silicas, and/or other ceramics, organo-metallics, metallic particulates, or other opaque particles that introduce color to the ink vehicle. The pigment may be any color, including, as examples, a cyan pigment, a magenta pigment, a yellow pigment, a black pigment, a violet pigment, a green pigment, a brown pigment, an orange pigment, a purple pigment, a white pigment, a metallic pigment (e.g., a gold pigment, a bronze pigment, a silver pigment, or a bronze pigment), a pearlescent pigment, or combinations thereof.

Examples of suitable blue or cyan organic pigments include C.I. Pigment Blue 1, C.I. Pigment Blue 2, C.I. Pigment Blue 3, C.I. Pigment Blue 15, C.I. Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

Examples of suitable magenta, red, or violet organic pigments include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 219, C.I. Pigment Red 224, C.I. Pigment Red 245, C.I. Pigment Red 286, C.I. Pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, and C.I. Pigment Violet 50.

Examples of suitable yellow organic pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 151, C.I. Pigment Yellow 153, C.I. Pigment Yellow 154, C.I. Pigment Yellow 167, C.I. Pigment Yellow 172, C.I. Pigment Yellow 180, and C.I. Pigment Yellow 185.

Carbon black may be a suitable inorganic black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® E, MOGUL® L, AND ELFTEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

Examples of brown organic pigments include C.I. Pigment Brown 1, C.I. Pigment Brown 5, C.I. Pigment Brown 22, C.I. Pigment Brown 23, C.I. Pigment Brown 25, C.I. Pigment Brown 41, and C.I. Pigment Brown 42.

Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, and C.I. Pigment Orange 66.

A suitable metallic pigment includes a metal chosen from gold, silver, platinum, nickel, chromium, tin, zinc, indium, titanium, copper, aluminum, and alloys of any of these metals. These metals may be used alone or in combination with two or more metals or metal alloys. Some examples of metallic pigments include STANDART® R0100, STANDART® R0200, and DORADO® gold-bronze pigments (available from Eckart Effect Pigments, Wesel, Germany).

The average particle size of the pigments may range anywhere from about 50 nm to about 200 nm. In an example, the average particle size ranges from about 80 nm to about 150 nm.

The total amount of pigment dispersion in the liquid ink ranges from about 2% actives to about 5% actives (based on the total wt % of the liquid ink). This weight percentage accounts for the weight percent of active pigment present in the liquid ink, and does not account for the total weight percent of the pigment dispersion in the liquid ink. As such, the weight percentages given for the pigment dispersion do not account for any other components (e.g., water) that may be present when the pigment is part of the dispersion.

As mentioned above, in some examples disclosed herein, the pigment may be dispersed by the anionic polymer (i.e., anionic polymeric dispersant). The dispersant may be present in an amount ranging from about 0.1 wt % to about 5 wt % of a total wt % of the liquid ink.

The liquid thermal inkjet ink may also include the polyurethane. In an example, the polyurethane is present in the polyurethane dispersion with water. The polyurethane dispersion is present in the ink in an amount ranging from about 1% actives to about 10% actives based upon the total wt % of the liquid ink. This weight percentage accounts for the weight percent of active polyurethane present in the liquid ink, and does not account for the total weight percent of the polyurethane dispersion in the liquid ink. As such, the weight percentages given for the polyurethane dispersion do not account for any other components (e.g., water) that may be present when the polyurethane is part of the dispersion.

The polyurethane dispersion may be added with the pigment (e.g., pigment dispersion) and the components of the ink vehicle to form the liquid thermal inkjet ink.

Examples of suitable polyurethanes include an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, a vinyl-urethane hybrid polymer, an acrylic-urethane hybrid polymer, a copolymer thereof, and a combination thereof.

As mentioned above, the liquid ink includes the wax emulsion in an amount less than 1% actives. In one example, the liquid ink includes substantially no wax emulsion. In another example, the liquid ink includes the wax emulsion in an amount ranging from about 0.25% actives to about (in some instances less than) 1% actives (based on the total wt % of the liquid ink). Again, this weight percentage accounts for the weight percent of active wax present in the liquid ink, and does not account for the total weight percent of the wax emulsion (which includes water) in the liquid ink.

The wax emulsion that is incorporated into the liquid ink may be any of the wax emulsions listed above in reference to the wax emulsion that is incorporated into the liquid bonding agent. The wax in the wax emulsion in the liquid ink may have the same ranges of melting points and/or particle sizes as the wax in the wax emulsion in the liquid bonding agent. The emulsifier used in the wax emulsion of the liquid ink may also be the same emulsifier that is incorporated into the wax emulsion of the liquid bonding agent. For example, the emulsifier used to stabilize the wax emulsion in the liquid ink may be the non-ionic emulsifier. As mentioned above, if the emulsifier were to be the cationic emulsifier, the cationic emulsifier would be susceptible to flocculation by the anionic components of the liquid ink. As also mentioned above, the anionic emulsifier may be incompatible with the liquid bonding agent because the anionic emulsifier may flocculate with the calcium cation of the calcium salt included in the liquid bonding agent. Thus, in examples in which the wax emulsion in the liquid bonding agent is the same as the wax emulsion in the liquid ink, the non-ionic emulsifier may be used rather than the anionic emulsifier. In an example, the wax emulsion in the liquid ink is the same as the wax emulsion in the liquid bonding agent. In another example, the wax emulsion in the liquid ink is different than the wax emulsion in the liquid bonding agent.

The wax emulsion may be added with the polyurethane (polyurethane dispersion), the pigment (e.g., pigment dispersion), and the other components of the ink vehicle to form the liquid thermal inkjet ink. The balance of the liquid ink is water.

After the liquid bonding agent and the liquid ink are prepared, the liquid bonding agent and the liquid ink may be applied to a substrate using a thermal inkjet printer. The liquid bonding agent may be digitally printed directly on the substrate, and the liquid ink may be digitally printed on top of the liquid ink. The substrate may be coated or uncoated paper.

Also disclosed herein is an inkjet printing system. In an example, the inkjet printing system is a thermal inkjet printing system. The inkjet printing system includes the liquid bonding agent and the liquid ink.

The liquid bonding agent of the inkjet printing system may be the liquid bonding agent described above. In an example, the liquid bonding agent of the inkjet printing system includes the calcium salt, the wax emulsion in an amount ranging from greater than 0% actives to about 2% actives, the acetylenic surfactant, the glycol, and a balance of water. In another example, the liquid bonding agent of the inkjet printing system excludes a pigment and a polymeric binder.

The liquid ink of the inkjet printing system may be the liquid ink described above. In an example, the liquid ink of the inkjet printing system includes the pigment dispersion, the polyurethane dispersion, the wax emulsion in an amount ranging from 0.25% actives to about (in some instances less than) 1% actives, the ether co-solvent, and a balance of water. In another example, the liquid ink of the inkjet printing system ink further includes the humectant, the phosphate surfactant, and the acetylenic surfactant. The wax emulsion and/or the acetylenic surfactant of the liquid ink may be the same as or different than the wax emulsion and/or the acetylenic surfactant (respectively) of the liquid bonding agent.

Also disclosed herein is a method for improving thermal inkjet print nozzle health and reliability (e.g., measured by filterability, agglomerate formation, and agglomerate recoverability). The method includes incorporating from greater than 0% actives to about 2% actives of the wax emulsion in the liquid bonding agent composition, and incorporating from about 0.25% actives to about (in some instances less than) 1% actives of the wax emulsion in the liquid ink. The wax emulsion incorporated into the liquid ink may be the same as or different than the wax emulsion incorporated into the liquid bonding agent.

The liquid bonding agent of the method may be the liquid bonding agent described above prior to the addition of the wax emulsion. In an example, the liquid bonding agent, into which the wax emulsion is incorporated, includes the calcium salt, the acetylenic surfactant, the glycol, and water.

The liquid ink of the method may be the liquid ink described above prior to the addition of the wax emulsion. In an example, the liquid ink, into which the wax emulsion is incorporated, includes the pigment dispersion, the polyurethane dispersion, the ether co-solvent, and water.

In an example, the method may further include excluding a pigment and a polymer binder from the liquid bonding agent.

To further illustrate the present disclosure, examples are given herein. It is to be understood that these examples are provided for illustrative purposes and are not to be construed as limiting the scope of the present disclosure.

EXAMPLES

Example 1

Five examples of the liquid thermal inkjet ink were prepared with a low density polyethylene wax emulsion. Each example ink had the same general formulation except for the active amount of wax incorporated therein. The wax amount in each of the five inks is shown below in Table 2. The general formulation of the five example inks, except for the active amount of wax incorporated therein, is shown in Table 1, with the wt % of each component that was used. The weight percentages of the pigment dispersion (labeled carbon black dispersion) and the polyurethane dispersion (labeled PU dispersion) represent the % actives, i.e., the total pigment solids and the total polyurethane solids present in the final formulations.

TABLE 1

| Component | Amount (wt %) |
| --- | --- |
| PU dispersion | 3.50 |
| Glycol Ether Co-solvent | 5.00 |
| Humectant | 2.00 |
| Phosphate Surfactant | 0.50 |
| Acetylenic Surfactant | 0.40 |
| Carbon Black dispersion | 2.75 |
| Water | Balance |

Each example ink was tested for filterability. To test for filterability, the example inks were loaded into a 60 mL Becton Dickinson syringe, which was subsequently fitted with a 0.7 μm polypropylene microfiber syringe filter (manufactured by Whatman). The syringe was then depressed at 60 psi.

The amount of wax actives contained in each example ink, the time it took to filter each example ink, and the amount of ink remaining once the filter clogged is shown in Table 2. A value of 0 for the amount of ink remaining indicates that the filter did not clog.

TABLE 2

| Example Ink | Wax Actives (%) | Time to Filter (s) | Ink Remaining (g) |
| --- | --- | --- | --- |
| MY-1652 | 0 | 25 | 0 |
| MY-1653 | 0.25 | 35 | 0 |
| MY-1654 | 0.50 | 52 | 0 |
| MY-1655 | 0.75 | 75 | 5 |
| MY-1656 | 1.00 | 55 | 17 |

As shown in Table 2, filterability decreases as the amount of wax actives incorporated in the ink increases. For example inks MY-1652, MY-1653, MY-1654, and MY-1655, the time it took to filter the ink increased as the amount of wax actives in the ink increased. The time it took to filter example ink MY-1656 was less than only MY-1655 because the filter clogged more quickly. Further, the three example inks with the lowest amounts of wax actives were able to be filtered completely without clogging the filter.

Each example ink was also tested for agglomerate formation and agglomerate recoverability. To test for agglomerate formation, the example inks were loaded into printheads. The printheads were uncapped and stored with the nozzles down in a 60° C. oven for 5 hours. Then, a nozzle health pattern was printed for each printhead by telling all the nozzles of the printhead to fire. The presence of agglomerates in the printhead nozzles may result in the non-firing of the nozzles, which is reflected in the nozzle health pattern.

Figure 2A:
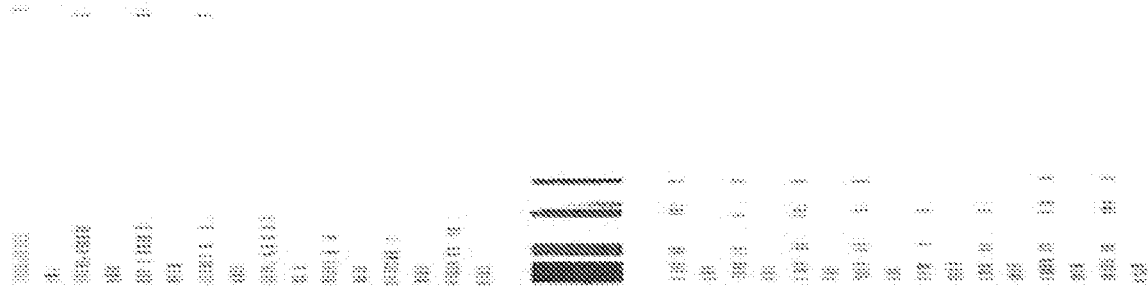
FIGS. 2A and 2B are illustrations of a first nozzle health pattern and a second nozzle health pattern (respectively) of another example of the liquid ink disclosed herein.
Figure 3A:
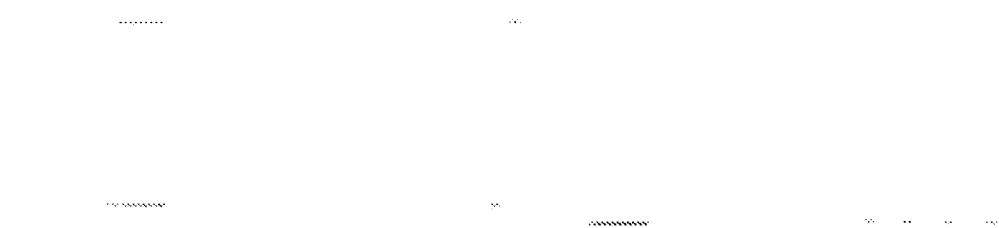
FIGS. 3A and 3B are illustrations of a first nozzle health pattern and a second nozzle health pattern (respectively) of still another example of the liquid ink disclosed herein.
Figures 4A, 4B, 5A:
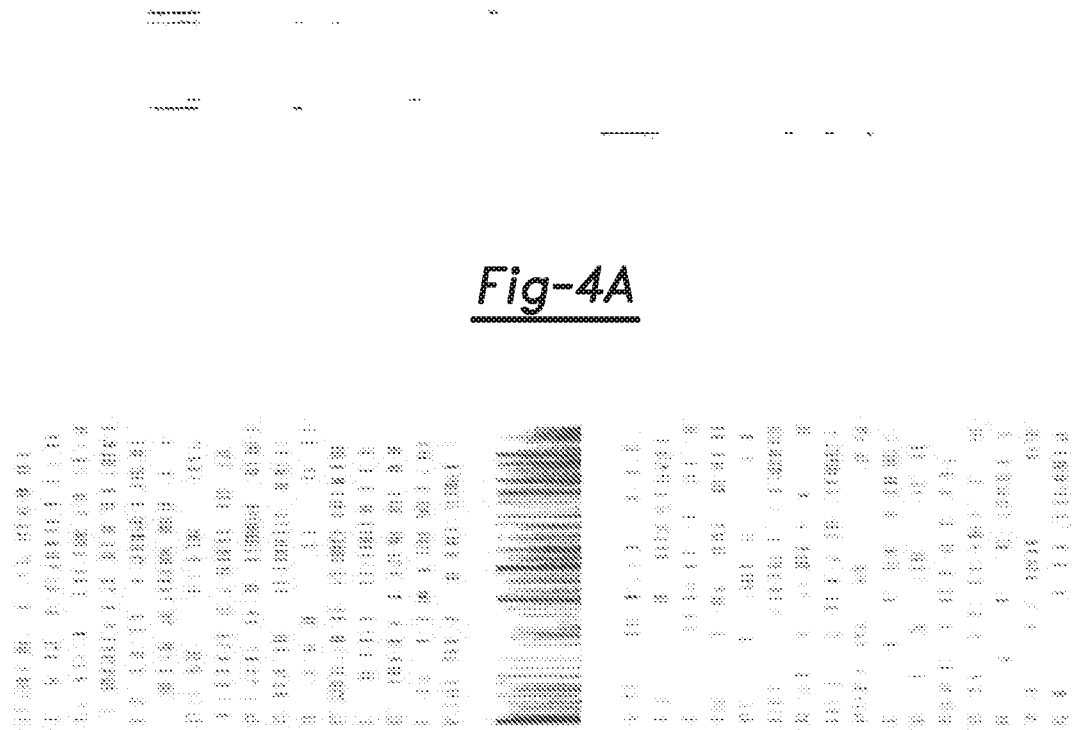
FIGS. 4A and 4B are illustrations of a first nozzle health pattern and a second nozzle health pattern (respectively) of still another example of the liquid ink disclosed herein.
FIGS. 5A and 5B are illustrations of a first nozzle health pattern and a second nozzle health pattern (respectively) of still another example the liquid ink disclosed herein.

FIG. 1A shows the nozzle health pattern for example ink MY-1652. FIG. 2A shows the nozzle health pattern for example ink MY-1653. FIG. 3A shows the nozzle health pattern for example ink MY-1654. FIG. 4A shows the nozzle health pattern for example ink MY-1655. FIG. 5A shows the nozzle health pattern for example ink MY-1656.

As shown in FIGS. 1A, 2A, 3A, 4A, and 5A, the formation of agglomerates increases as the amount of wax actives incorporated in the ink increases. Less ink is printed on the nozzle heath patterns for the example inks that contain a higher amount of wax actives.

After printing the nozzle health patterns shown in FIGS. 1A, 2A, 3A, 4A, and 5A, each example was tested for agglomerate recoverability (i.e., removal of the agglomerate to enable nozzle firing). To test for agglomerate recoverability, each printhead was serviced with a combination of nozzle spitting, wiping with dry polyester fabric, wiping with a water-wetted polyester fabric, and flushing with de-ionized water. Then a second nozzle health pattern was printed for each printhead. The removal of agglomerates from the printhead nozzles results in fewer instances of the nozzles non-firing, which is reflected in the second nozzle health pattern.

Figure 1B:
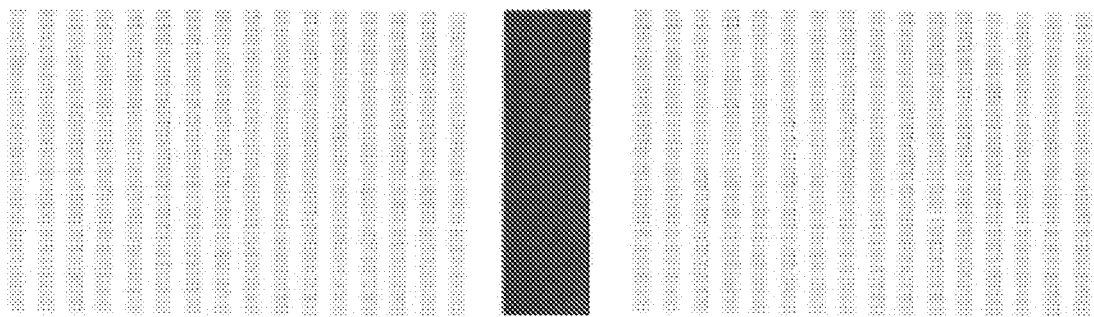
Figure 2B:
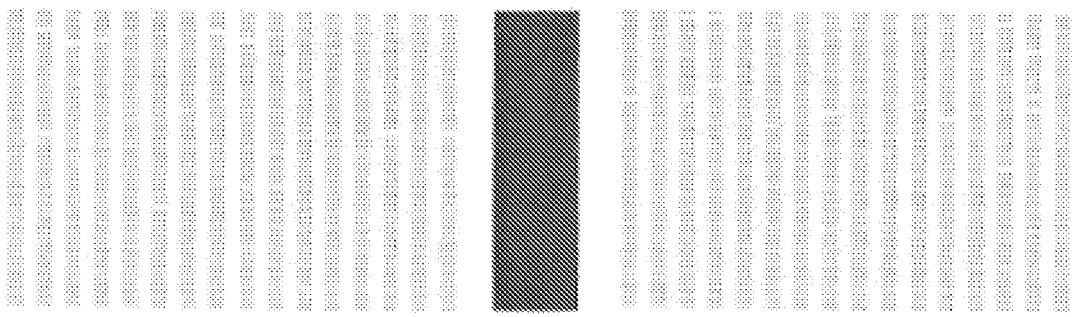
Figure 3B:
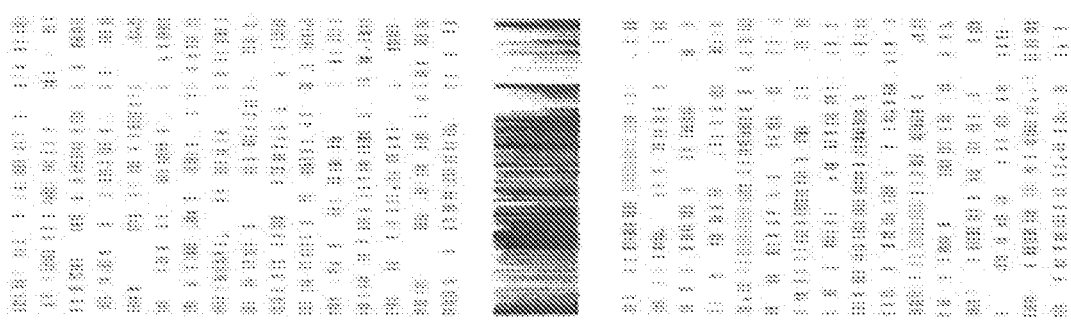
Figure 5B:
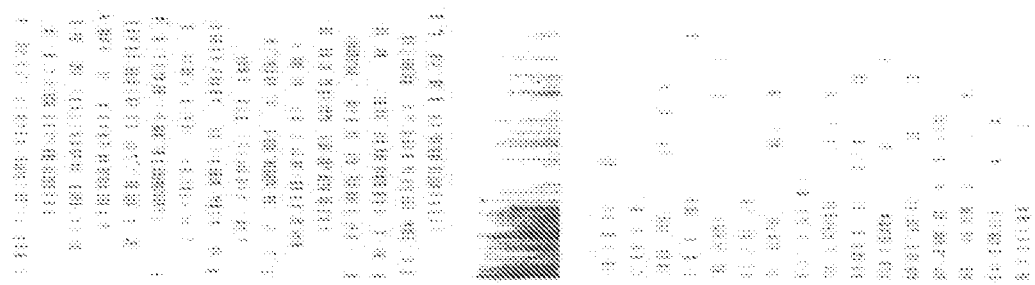

FIG. 1B shows the second nozzle health pattern for example ink MY-1652. FIG. 2B shows the second nozzle health pattern for example ink MY-1653. FIG. 3B shows the second nozzle health pattern for example ink MY-1654. FIG. 4B shows the second nozzle health pattern for example ink MY-1655. FIG. 5B shows the second nozzle health pattern for example ink MY-1656.

As shown in FIGS. 1B, 2B, 3B, 4B, and 5B, the recoverability of agglomerates decreases as the amount of wax actives incorporated in the ink increases. While less ink was printed on the second nozzle heath patterns for the example inks that contained a higher amount of wax actives (e.g., comparing MY-1654, MY-1655 and MY-1656 with MY-1652 and MY-1653), the second nozzle health patterns for each of inks MY-1653, MY-1654, MY-1655, MY-1656 were better than the first nozzle health patterns for the respective inks.

Figure 6A:
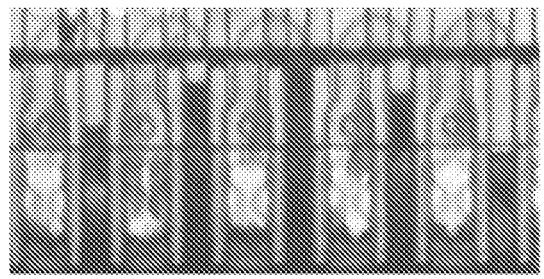
FIGS. 6A and 6B are illustrations of microscopic images of printhead nozzles before and after servicing (respectively).
Figure 6B:
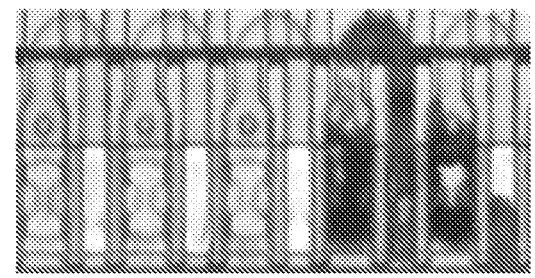

FIG. 6A shows an illustration of a microscopic image of printhead nozzles after oven storage for example ink MY-1653, and FIG. 6B shows an illustration of a microscopic image of printhead nozzles after servicing for example ink MY-1653. FIG. 6A shows that the printhead nozzles are partially occluded, and FIG. 6B shows that the occlusion of the printhead nozzles is reduced.

Example 2

Three examples of the liquid bonding agent and two examples of the liquid thermal inkjet ink were prepared with a low density polyethylene wax emulsion. The example inks used were MY-1653 (0.25% wax actives) and MY-1654 (0.50% wax actives), which are described above. Each example bonding agent had the same general formulation except for the amount of wax actives incorporated therein. The general formulation of the three example bonding agents, except for the active amount of wax incorporated therein, is shown in Table 3, with the wt % of each component that was used.

TABLE 3

| Component | Amount (wt %) |
| --- | --- |
| Calcium Salt | 10.8 |
| Acetylenic Surfactant | 0.2 |
| Glycol Co-solvent | 12.0 |
| Water | Balance |

The wax amount in each of the three example bonding agents is shown below in Table 4. A comparative bonding agent was also prepared with the same general formulation as the example bonding agents except that the comparative bonding agent contained no wax emulsion.

Each example bonding agent was used with each example ink to print a solid black pattern on a RockTenn 3 uncoated (RT3) substrate. The comparative bonding agent was also used with each example ink to print the solid black pattern on the RT3 substrate.

Each print was tested for smear durability and abrasion durability. To test for smear durability, the prints were rubbed with a square of the RT3 substrate in a circular motion for 1 cycle. The L* of the square was measured. A higher L* value indicates less ink transfer. To test for abrasion durability, the prints were rubbed 250 times with a Sutherland® 2000™ rub tester (manufactured by Gardco). The damage to the print was graded visually using a scale of 1-5, with 5 indicating no damage seen and 1 indicating that the ink film was scrapped off completely.

The results of the smear durability test and abrasion durability test for each print is shown in Table 4.

TABLE 4

| Wax Actives in Ink (%) | Wax Actives in Bonding Agent (%) | Smear | Abrasion |
|---|---|---|---|
| 0.25 | 0 | 222 | 1 |
| 0.25 | 1.0 | 222 | 4 |
| 0.25 | 1.5 | 222 | 4 |
| 0.25 | 2.0 | 222 | 4 |
| 0.50 | 0 | 222 | 4 |
| 0.50 | 1.0 | 222 | 5 |
| 0.50 | 1.5 | 222 | 5 |
| 0.50 | 2.0 | 222 | 5 |

As shown in Table 4, the prints created with the example bonding agents have improved durability over the print created with the comparative bonding agent (including no wax) for the same example ink. While the smear values are the same for the example bonding agents and the comparative bonding agent, the abrasion values for the example bonding agents are 4 (as compared to 1 for the comparative bonding agent) for the example ink, MY-1653 (containing 0.25% wax actives) and 5 (as compared to 4 for the comparative bonding agent) for the example ink, MY-1654 (containing 0.50% wax actives).

Thus, with the use of the example bonding agents, the liquid thermal inkjet ink can contain fewer wax actives to improve filterability, reduced agglomerate formation, and improved agglomerate recoverability (as shown above in Example 1) and maintain a threshold level of durability.

It is to be understood that the ranges provided herein include the stated range and any value or sub-range within the stated range. For example, a range from about 0.25 wt % to about 2 wt % should be interpreted to include not only the explicitly recited limits of about 0.25 wt % to about 2 wt %, but also to include individual values, such as 0.5 wt %, 1.25 wt %, 1 wt %, 1.55 wt %, etc., and sub-ranges, such as from about 0.35 wt % to about 1 wt %, from about 0.5 wt % to about 1.7 wt %, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A liquid bonding agent for a liquid ink, the liquid bonding agent comprising:
    a calcium salt;
    a first wax emulsion present in an amount ranging from greater than 0% actives to about 2% actives;
    an acetylenic surfactant;
    a glycol; and
    a balance of water;
    wherein the liquid bonding agent is to be digitally printed with a thermal inkjet printhead on a substrate under the liquid ink;
    wherein the liquid bonding agent excludes a pigment and a polymeric binder;
    and wherein the liquid ink includes a second wax emulsion present in an amount ranging from about 0.25% actives to less than 1% actives.

2. The liquid bonding agent as defined in claim 1 wherein:
    the calcium salt is present in an amount ranging from about 5 wt % to about 15 wt %;
    the acetylenic surfactant is present in an amount ranging from about 0.25 wt % to about 2 wt %; and
    the glycol is present in an amount ranging from about 2 wt % to about 20 wt %.

3. The liquid bonding agent as defined in claim 1 wherein the calcium salt is selected from the group consisting of calcium propionate, calcium pantothenate, calcium nitrate, and combinations thereof.

4. The liquid bonding agent as defined in claim 1 wherein:
    the wax emulsion is selected from the group consisting of a low density polyethylene wax emulsion, a paraffin wax emulsion, a carnauba wax emulsion, a polytetrafluoroethylene wax emulsion, and a combination thereof; and
    a melting point of a wax in the wax emulsion is one of:
        less than 105° C.; or
        greater than 300° C.

5. The liquid bonding agent as defined in claim 1 wherein a particle size of a wax in the wax emulsion is less than 500 nm.

6. An inkjet printing system, comprising:
    a liquid bonding agent, including:
        a calcium salt;
        a first wax emulsion present in an amount ranging from greater than 0% actives to about 2% actives;
        a first acetylenic surfactant;
        a glycol; and
        a balance of water;
        wherein the liquid bonding agent excludes a pigment and a polymeric binder; and
    a liquid ink, including:
        a pigment dispersion;
        a polyurethane dispersion;
        a second wax emulsion present in an amount ranging from about 0.25% actives to less than 1% actives;
        an ether co-solvent; and
        a balance of water.

7. The inkjet printing system as defined in claim 6 wherein the liquid ink further includes a humectant, a phosphate surfactant, and a second acetylenic surfactant.

8. The inkjet printing system as defined in claim 7 wherein:
    the calcium salt is present in the liquid bonding agent in an amount ranging from about 5 wt % to about 15 wt %;
    the first acetylenic surfactant is present in the liquid bonding agent in an amount ranging from about 0.25 wt % to about 2 wt %;

the glycol is present in the liquid bonding agent in an amount ranging from about 2 wt % to about 20 wt %;

the pigment dispersion is present in the liquid ink in an amount ranging from about 2% actives to about 5% actives;

the polyurethane dispersion is present in the liquid ink in an amount ranging from about 1% actives to about 10% actives;

the ether co-solvent is present in the liquid ink in an amount ranging from about 2 wt % to about 12 wt %;

the humectant is present in the liquid ink in an amount ranging from about 2 wt % to about 12 wt %;

the phosphate surfactant is present in the liquid ink in an amount ranging from about 0.25 wt % to about 2 wt %; and the second acetylenic surfactant is present in the liquid ink in an amount ranging from about 0.25 wt % to about 2 wt %.

9. The inkjet printing system as defined in claim 6 wherein:

the polyurethane dispersion is selected from the group consisting of an aromatic olyether polyurethane dispersion, an aliphatic polyether polyurethane dispersion, an aromatic polyester polyurethane dispersion, an aliphatic polyester polyurethane dispersion, an aromatic polycaprolactam polyurethane dispersion, an aliphatic polycaprolactam polyurethane dispersion, a vinyl-urethane hybrid polymer dispersion, an acrylic-urethane hybrid polymer dispersion, a dispersion of co-polymers thereof, and a combination thereof; and the calcium salt is selected from the group consisting of calcium propionate, calcium pantothenate, calcium nitrate, and combinations thereof.

10. The inkjet printing system as defined in claim 6 wherein each of the first wax emulsion and the second wax emulsion is selected from the group consisting of a low density polyethylene wax emulsion, a paraffin wax emulsion, a carnauba wax emulsion, a polytetrafluoroethylene wax emulsion, and a combination thereof; and a melting point of each of a wax in the first wax emulsion and a wax in the second wax emulsion is one of:

less than 105° C.; or greater than 300° C.

11. The inkjet printing system as defined in claim 6 wherein the inkjet printing system is a thermal inkjet printing system.

12. A method for improving thermal inkjet print nozzle health and reliability, the method comprising:

incorporating from greater than 0% actives to about 2% actives of a wax emulsion in a liquid bonding agent composition, including:

a calcium salt;

an acetylenic surfactant;

a glycol; and water;

wherein the liquid bonding agent excludes a pigment and a polymeric binder; and incorporating from about 0.25% actives to less than 1% actives of the wax emulsion in a liquid ink, including:

a pigment dispersion;

a polyurethane dispersion;

an ether co-solvent; and water.

13. The method as defined in claim 12 wherein thermal inkjet print nozzle health and reliability is measured by filterability, agglomerate formation, and agglomerate recoverability.

* * * * *